Oct. 30, 1945.　　　L. H. LEONARD　　　2,387,762
AIRCRAFT
Filed Jan. 25, 1941　　　5 Sheets-Sheet 4

Inventor
Lloyd H. Leonard,
By Stone, Boyden & Mack.
Attorneys

Oct. 30, 1945.　　　　　L. H. LEONARD　　　　　2,387,762
AIRCRAFT
Filed Jan. 25, 1941　　　　　5 Sheets-Sheet 5

Lloyd H. Leonard,
By Stone, Boyden & Mack.
Attorneys.

Patented Oct. 30, 1945

2,387,762

UNITED STATES PATENT OFFICE 2,387,762

AIRCRAFT

Lloyd H. Leonard, Washington, D. C.

Application January 25, 1941, Serial No. 375,991

25 Claims. (Cl. 244—7)

This invention relates to aircraft, and more particularly to aircraft of the power driven, heavier-than-air type.

Such aircraft or airplanes, as heretofore commonly constructed, comprise a fuselage having laterally projecting wings, and one or more relatively small propellers operating in a plane transverse to the axis of the fuselage.

Airplanes of this type require a relatively long runway from which to take off, or on which to land, and the area of the wings must be large enough to provide sufficient surface to afford the lift necessary for these take-off and landing operations. In other words, the size of the wings is determined not by the area necessary to sustain the craft at flying speeds, but by the lifting surface required at the very much slower speeds employed for take-off and landing. Hence, the size of the wings, considered from the viewpoint of flying speed, is excessive, and results in relatively small loading and low efficiency. Moreover, this excessive size of the wings creates a very objectionable "drag" or resistance which absorbs a large amount of power and tends to limit flying speed.

It is thus obvious that if some means could be provided for once getting the craft into the air and bringing it up to normal speed, the size of the wings or areas of the lifting surface could be very greatly reduced, and the efficiency correspondingly increased.

One object of the present invention is to provide an improved arrangement whereby the same propeller means which propels the craft during normal horizontal flight may also be used to cause the craft to rise or descend substantially vertically, after the manner of a helicopter, so that no runway is needed. By this means, the lifting surface required, being employed only to sustain the craft at flying speeds, may be reduced to a minimum, and designed to operate at high loading and maximum lifting efficiency.

Another object is to provide improved means whereby the aircraft may be supported on the ground in an upright position, rise substantially endwise, level off into a substantially horizontal position for normal flight, after having reached the desired altitude, and descend endwise and land again in an upright position. To this end I have devised an improved landing gear comprising a plurality of leg members extending longitudinally of the fuselage at one end during flight, and capable of being spread or expanded to provide a structure with a wide base adapted to support the fuselage in upright position. Such landing gear also incorporates resilient or fluid controlled means for cushioning the impact and absorbing the shock when coming into contact with the ground, upon landing.

It is contemplated that the craft will normally descend under power, that is, with the propeller means driven, and thus, by controlling the speed, the descent may be retarded as much as desired, to effect a gentle landing. However, it is possible that the engine may go "dead," and that it may thus be necessary to descend without power. Hence, I propose to construct the propeller means of such large size that it will itself, when freed from the engine, retard the descent sufficiently to prevent damage or injury to the craft or its occupants, when suitable cushioned landing gear is provided.

With relatively large propeller means, such as I propose to use, it is desirable to drive it at relatively low speeds, while, for efficiency, it is desirable to operate the engine at higher speeds, and I, therefore, provide speed reduction gearing between the engine and propeller means.

Moreover, I find it desirable to set the propeller blades at a different pitch, and to drive them at a different speed under different conditions, as when rising vertically and when traveling horizontally. Another object of the invention is, therefore, to provide improved means for varying the pitch, and also to provide change speed gearing between the engine and propeller means. More specifically, in the preferred form of the invention, I provide means whereby both pitch and speed may be simultaneously changed by the movement of a single control member.

A still further object of the present invention is to provide an aircraft of the above character in which the pilot shall have maximum full vision, and to this end, in the preferred form, I place the pilot's compartment in the nose of the fuselage, and dispose the power and propeller means behind this compartment, or, in other words, at a point amidships, such propeller means, of course, being concentric with the axis of the fuselage. This not only gives the pilot maximum vision at all times, but when landing tail first, as proposed, the weight of the engine is below, rather than above him. For greater stability, I preferably provide wing surfaces both fore and aft of the propeller means.

While many of the advantages of the invention may be achieved by means of a single propeller, if properly driven, I contemplate using, as probably more practical, a pair of tandem propellers, connected with the same power means.

Another object of the invention, therefore, is to devise improved means for driving such tandem propellers. To this end, when using any suitable engine as a source of power, such engine having a frame and a shaft, I provide means whereby both parts are rotatably mounted, and I operatively connect one of said parts to one propeller and the other of said parts to the other propeller. Thus, the two propellers are driven in opposite directions.

I further propose to assist in steering or balancing the aircraft by use of the propeller means. Thus, still another object of the invention is to provide improved manually controlled means for automatically changing the pitch of the blades at different points in the revolution of the propeller, as desired. In this way, the blades may be caused to assume a steeper pitch at one side of the machine, for example, than at the other, thus exerting a turning moment on the plane of the rotor at the will of the pilot.

With the above and other objects in view, and to improve generally on the details of design of aircraft of the type in question, the invention consists in the construction, combination and arrangement of parts hereinafter described and claimed, and illustrated by way of example in the accompanying drawings, forming part of this specification, and in which:

Referring to the drawings in detail and more particularly first to Figs. 1 to 4, inclusive, my improved aircraft comprises an elongated streamlined body or fuselage having nose and tail portions.

In the preferred form shown in these figures, I provide at the nose of the craft a passenger compartment 1, adapted to contain the pilot and one or more other persons, and in order to give the pilot full vision, I form the walls of the compartment of a plurality of transparent panels 1ª.

Figures 1, 2, 3, 4, 18, 19, 20:
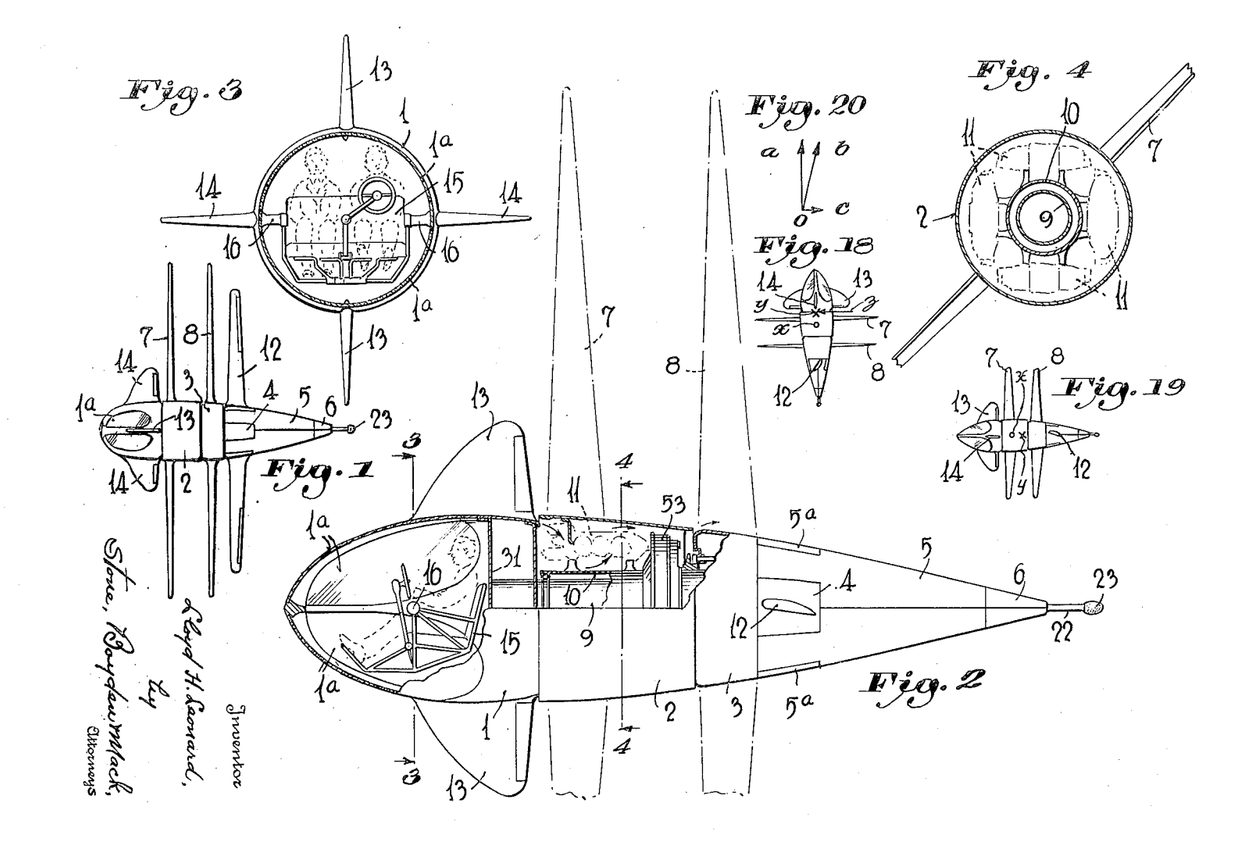
Fig. 1 is a plan view on a reduced scale showing one form of my improved aircraft.
Fig. 2 is a side elevation of the same on an enlarged scale, parts being broken away, and parts shown in section, the view illustrating the craft in its position of horizontal flight.
Fig. 3 is a transverse section substantially on the line 3—3 of Fig. 2, looking in the direction of the arrows.
Fig. 4 is a transverse section substantially on the line 4—4 of Fig. 2, looking in the direction of the arrows.
Figs. 18 and 19 are small scale side elevations similar to Fig. 2, illustrating the craft as it appears in vertical and horizontal flight, respectively, and showing the positions of the aerodynamic center and center of gravity.
Fig. 20 is a diagram illustrating the forces acting on the craft when in the position of Fig. 18.

To the rear of this passenger compartment and substantially amidships of the craft, I provide one or more rotary sections conforming with the streamlined shape of the body. In the drawings two such sections 2 and 3 are shown, disposed one behind the other.

These rotary sections constitute, in effect, the hubs of propellers shown in broken lines at 7 and 8. These propellers are shown as having two blades each. The propellers are of the well-known twin or tandem type constructed to be driven in opposite directions, and having the blades oppositely inclined.

To the rear of the propeller 8 are a plurality of fixed portions 4, and rearwardly of these portions extend streamlined segments 5 and 6 constituting the tail portion of the craft and also, as will hereinafter appear, constructed to form the landing gear.

In this connection, it will be understood that, as stated in the preamble, my improved aircraft is designed to land endwise tail first, and to stand on the ground in upright position, all as hereinafter more fully described.

The passenger compartment at the nose, and the tail portion comprising the parts 4, 5 and 6 are rigidly united by a central tubular structure 9, as shown, around which tubular structure the propellers 7 and 8 revolve, these propellers thus being mounted substantially concentric with the axis of the fuselage and operating in a plane transverse thereto.

I propose to drive the propellers of my improved aircraft by means of one or more power units located in the annular space between the tubular structure 9 and the outer section 2 of the shell. In Figs. 2 and 4, I have illustrated conventionally in dotted lines a set of four engines 11. The frames of these engines, which may be of any suitable type, are fixedly mounted on a second tubular structure 10 which is supported and journaled on the tubular structure 9. Additional details of the method of driving the propellers by means of these engines will be given later on.

In order to sustain the aircraft in horizontal flight, I preferably provide wing surfaces both fore and aft, that is to say, both in front of and behind the propellers. As shown in Figs. 1 and 2, I mount a pair of wings 12 on the fixed portions 4 of the fuselage at a point behind the rear propeller 8, and I also provide a pair of vertical and a pair of horizontal wing surfaces or control fins 13 and 14 extending radially from the passenger compartment, just in front of the forward propeller 7.

As stated in the preamble, and as hereinafter more fully described, the wing surfaces 12 and 14 which cooperate in providing the necessary lift are relatively much smaller than the wing surfaces commonly employed in airplanes of the usual type, thus for the reason that these wing surfaces are required to be only sufficiently large to sustain the craft during horizontal flight at normal speeds, and usually at relatively low altitudes. Thus, the loading of these wing surfaces is very high and they operate at a lifting efficiency approaching maximum. Similarly, the drag or resistance which they offer to the passage of the craft through the air is reduced to a minimum. The fuselage itself, of course, also may serve to some extent as a lifting surface.

Since, as stated in the preamble, my improved aircraft is designed to rise vertically endwise and to then travel horizontally in normal flight, the seat 15 for accommodating the pilot or other occupant of the passenger compartment is suspended from a pivot 16 in such manner that it may swing about this pivot as the angle to the ground is changed, so that the ocupants of the seat may always be maintained in an upright position.

Figures 5, 6, 7:
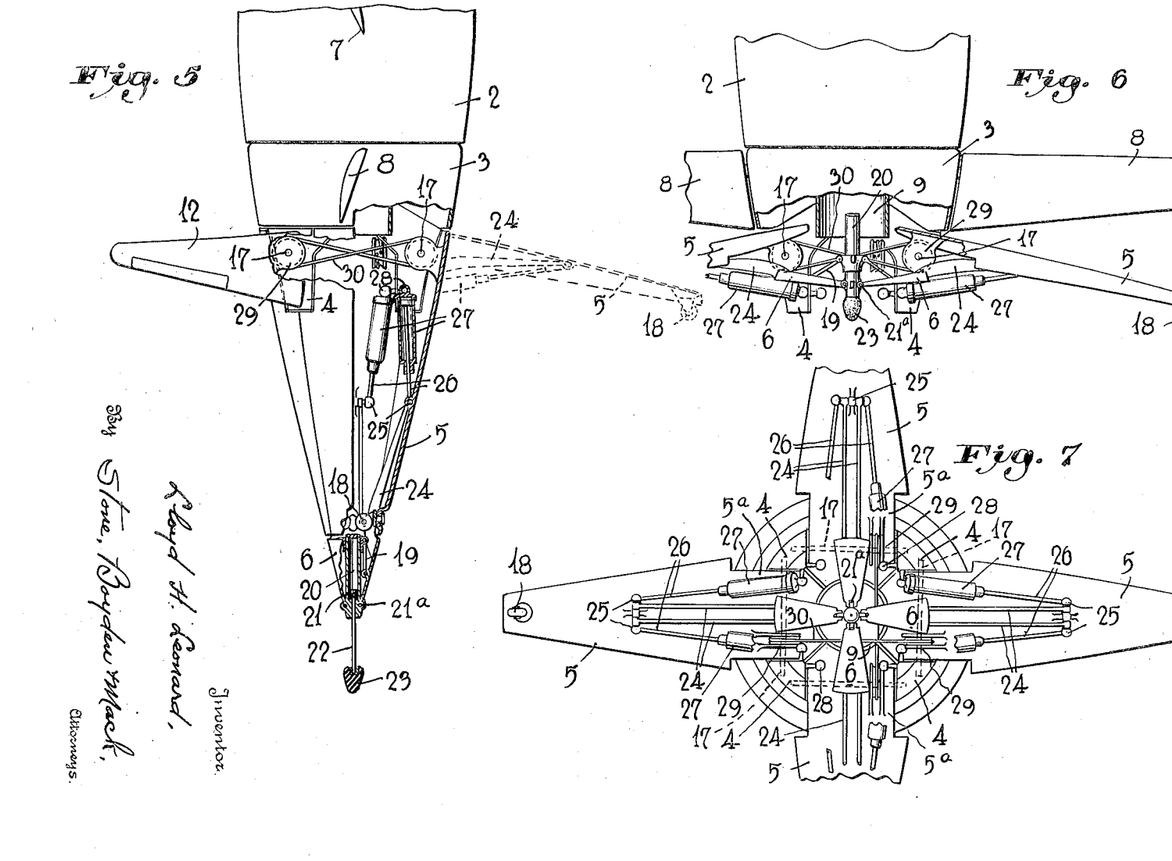
Fig. 5 is a sectional elevational view on a somewhat enlarged scale showing the rear or tail portion of the aircraft illustrated in Fig. 2, such part comprising my improved landing gear, the parts being shown in full lines in the position which they occupy during flight and in dotted lines in the position which they occupy when on the ground.
Fig. 6 is a fragmentary elevational view showing the landing gear as it appears when fully expanded and resting on the ground, parts being in section, and parts being omitted for the sake of clearness.
Fig. 7 is an end or bottom view looking upward at the parts illustrated in Fig. 6, the wings being omitted.

Referring now to Figs. 5, 6 and 7, I have illustrated more in detail the improved landing gear constituting the tail portion of the aircraft.

As already stated, there are a plurality of fixed portions 4 projecting back behind the rearmost rotor or propeller, and the streamlined segments 5 forming the tail portions have narrowed end portions 5ª which extend between the fixed portions 4 and which are pivotally mounted on transversely extending rods 17, so that the segments 5 may swing from the normal streamlined position shown in Fig. 5 to the expanded position shown in Figs. 6 and 7.

At the ends of the segments 5 are ground wheels or rollers 18 of any suitable type, these rollers being normally housed within the tail of the craft as shown in Fig. 5.

Beyond the end of the segments 5 are a similar number of smaller segments 6, forming the tip of the tail, and these are pivotally mounted at 21ª upon a cylinder 20 extending axially of the tail, and are also connected to the inner end of said cylinder by means of links 19. A piston 21 is mounted to reciprocate in the cylinder 20 and is carried by a rod 22 which extends rearwardly and is provided at its end with a rubber or other suitable bumper 23. The purpose of the piston and cylinder just described is to act as a pneumatic cushion to absorb the shock at the moment of impact of the bumper 23 with the ground.

Rigidly secured to each segment 6 and extending forwardly within the tail is an arm 24, the end of which is pivoted as at 25 to the adjacent segment 5. Also pivoted at 25 is one end of a pair of piston rods 26 carrying at the other ends pistons which slide in cylinders 27 pivotally secured as at 28 to the fixed portions 4. These cylinders and pistons also act to cushion and retard the opening movement of the segments.

In order to insure that the segments 5 on opposite sides of the tail open simultaneously and to the same extent, a pulley 29, concentric with the pivot 17, is rigidly secured to each segment, and a band or belt 30 passes around and connects pulleys at the opposite sides of the tail as shown.

If we assume the aircraft to be descending vertically in the position shown in Fig. 5, the bumper 23 will engage the ground and upon further movement the cylinder 20, acting through the links 19 and arms 24 will cause both the segments 5 and 6 to expand into the position shown in Figs. 6 and 7, thus bringing the rollers 18 into engagement with the ground at widely separated points, thus constituting a broad base on which the aircraft may be supported in upright position, as shown in Fig. 6.

From the foregoing, it will be understood that as the end of the tail of the aircraft contacts the ground, the segments 5 will be automatically expanded or opened up, retarded by the cylinders 27 so as to form legs capable of supporting the aircraft in upright position.

Figure 8:
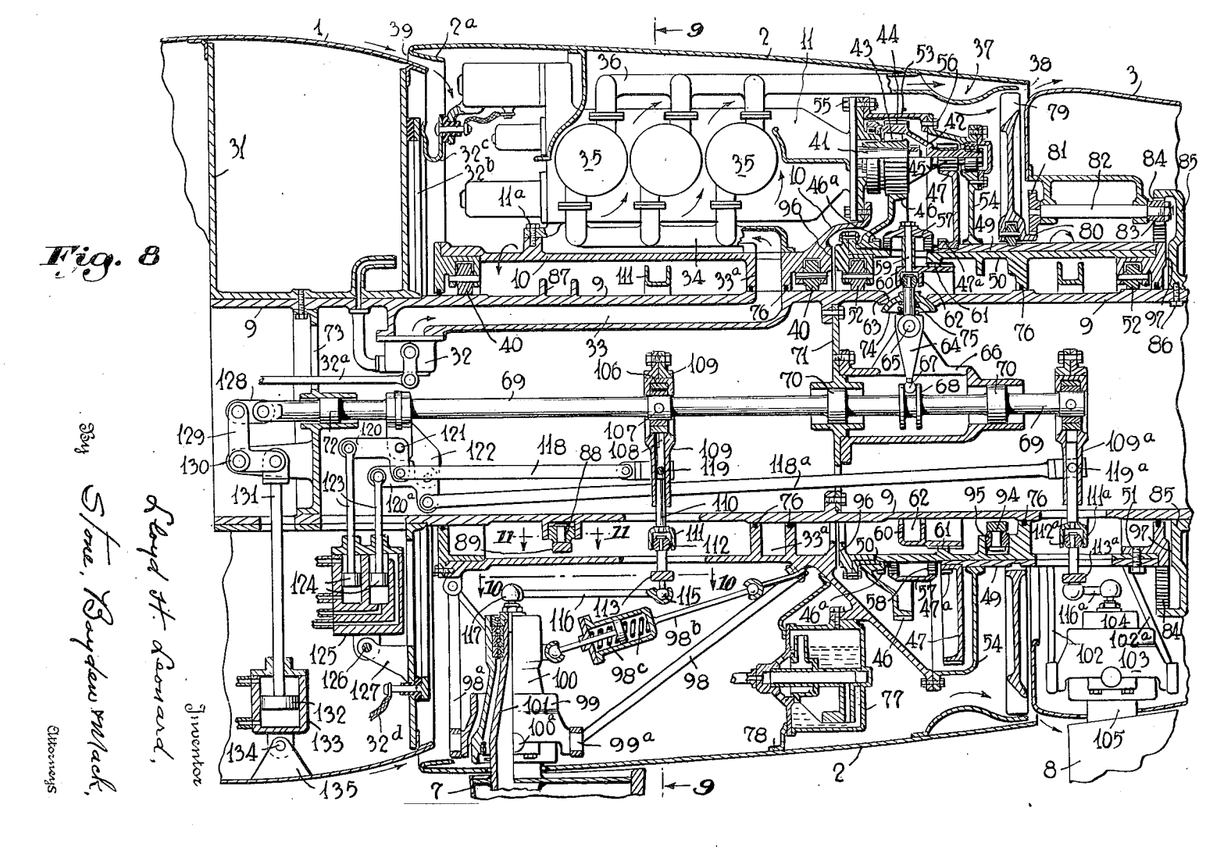
Fig. 8 is a longitudinal section on an enlarged scale through the central portion of the aircraft illustrated in Fig. 2, showing the driving and control mechanism, parts being broken away.

Referring now more particularly to Fig. 8, it will be seen that I have there illustrated on an enlarged scale a part of the nose section 1 and the rotary sections 2 and 3 of the fuselage. A fuel tank 31 is preferably provided in the nose section and from this tank extends a pipe to a suitable carbureter 32, having a throttle value control rod 32ª. Electrical connections to the engines are provided by a slip ring 32ᵇ and brushes 32ᶜ, from a supply lead 32ᵈ. A conduit 33, rigid with and shown as forming part of the inner fixed tubular structure 9, extends from the carbureter to an annular channel 33ª, and the intake manifold 34 of each of the power units or engines 11 taps this annular channel. The cylinders of the engine are shown at 35 and the exhaust manifold at 36. This is connected at its rear end with an annular space 37 and the exhaust gases are thence discharged through a narrow annular slit so positioned as to produce an ejector action serving to cause a flow of air outward through the air exit slot 38 between the cowling sections 2 and 3 of the fuselage. At its forward end the section 2 is preferably folded inwardly on itself as indicated at 2ª and spaced slightly from the rear end of the nose section 1 so as to provide an annular intake slot 39 for cooling air. This air then flows over the engines and out at 38 as described.

The engine units 11 are bolted as at 11ª to the outer annular structure 10 already referred to, which structure surrounds the fixed tubular structure 9 and is mounted to rotate thereon by means of suitable rollers 40.

41 designates the shaft of each of the engine units and driven through these shafts, through a free-wheeling unit 43, is a gear element comprising a large pinion 44 and a smaller pinion 45. The pinion 44 meshes with a large ring gear 46 and the pinion 45 meshes with a ring gear 47, both freely journaled upon an annular structure comprising an outer member 49 secured by bolts 51 to an inner member 50. These annular members 49 and 50 are mounted for rotation on the fixed member 9 by means of suitable rollers 52.

A gear box or housing comprising the members 53 and 54 bolted to each other as at 56 and to the engine frames as at 55 constitutes one rigid structure with the engine frames, all of which rotates around the central tubular structure 9 and is also rigidly secured to the rotary section 2 which carries the propeller or rotor blades 7 and which rotates with it.

In order to change the speed of the propellers, as required for different conditions, I provide a shiftable gear member 57. This is in the nature of an annular clutch ring having teeth 58 on its inner periphery at each side, such teeth being adapted to engage and interlock selectively with similar teeth 46ª on the hub of the gear 46 and teeth 47ª on the hub of the gear 47.

The clutch ring 57 is supported on spokes 59 radiating from an inner annular member 60 slidably interlocked by means of interengaging teeth or keys 61 with the tubular structure 50.

The annular member 60 is provided with an internal channel 62 in which works a plurality of rollers 63 carried at the ends of levers 64 pivoted at 65 to a fixed bracket structure 66. The levers 64 engage at their inner ends 67 a pair of spaced collars 68 formed on a control shaft 69 mounted to reciprocate and provided with cylindrical surfaces 70 adapted to slidably engage guideways carried by the bracket structure 66 and by a partition wall 71 on which the bracket structure is mounted.

At a point spaced forwardly of the partition 71 is a second partition 73 carrying a similar guideway in which slides another cylindrical surface 72 formed on the control shaft 69.

Each lever 64 passes through an opening in the wall of the fixed tubular structure 9 and this opening is sealed by means of a guard 74 in the shape of a spherical segment centered about the pivot point 65, and urged by a spring 75 against the edges of the opening.

Interposed between the rotary tubular structures 10 and 50, and the central fixed tubular structure 9 at various points of contact, as shown in the drawings, are sealing rings or gaskets 76. These, together with the guard member 74, practically seal the entire gear box and change-speed mechanism so that it may be filled with grease or heavy oil, in which the gears run.

77 designates the lubricating oil tank for the engine units, and it is shown as secured at one side to the gear box 53 and at the other side to the rotary section 2 by means of a bracket 78. Oil from this tank is delivered to the engine units by means of an oil pump (not shown) in a well-known manner.

In order to increase the flow of air through the engine compartment from the intake 39 to the discharge at 38, I preferably provide a fan 79. This is mounted to rotate on the tubular member 49, as by means of rollers, and is provided at its hub with a gear 80, meshing with a pinion 81 secured to a shaft 82, which shaft carries at its other or rear end a second pinion 83 meshing with the teeth 84 of an internal ring gear 85 rigidly secured as at 86 to the fixed tubular structure 9. Thus, as the rotary section 3, carrying the rear rotor or propeller, revolves, the shaft 82 is driven as the pinion 83 travels around the fixed ring gear 85, and in turn drives the fan.

Referring again to the change-speed gearing, it will now be understood from the foregoing that the rear rotor section 3 carrying the propeller blades 8 is rigid with and driven by the rear tubular structure 49, 50, which structure is in turn splined to the annular member 60 to which the change-speed clutch 57 is rigidly secured. As is also obvious from the foregoing, this change-speed clutch 57 may be shifted by means of the control shaft 69 so as to selectively engage and interlock with either the teeth 46ª on the gear 46 or the teeth 47ª on the gear 47. When the clutch member 57 is shifted so as to interlock with the gear 46, power is transmitted from the engine shaft through this gear 46, thence through the clutch member 57 to the annular member 60 and thence, through the interengaging teeth 61 to the rear tubular structure 49, 50. This structure, and with it the rear rotor, is then driven at a relatively high speed.

If, however, the clutch member 57 is shifted the other way so as to engage and interlock with the gear 47, then the drive is from the engine shaft through the pinion 45, gear 47, clutch member 57 and annular member 60 to the tubular structure 49, 50, this drive being at a relatively low speed, due to the fact that the pinion 45 is relatively small and the gear 47 relatively large.

As already intimated, the forward rotor, having the blades 7, is carried by the rotary section 2 which, in turn, is rigid with the rotary tubular structure 10 and gear box 53, 54, all of which is rigid with the frames of the engine units. Thus, the engine frames are mounted to revolve bodily, and drive directly the forward rotor, while the engine shafts drive the rear rotor in the opposite direction through the change-speed gearing above described.

Thus, although the change-speed gearing is provided only between one part of the engine units and one rotor, the result is achieved that the shifting of this change-speed gearing varies the speed of both rotors, because of the reaction between the frame and shaft of the engine unit and the balance established between this reaction and the load on the propeller blades.

As above explained, the radial load or thrust due to the two rotor sections 2 and 3 and their associated parts is carried by the rollers 40 and 52, engaging the surface of the fixed tubular structure 9. I also propose to provide means for sustaining the axial thrust on these rotors. This I accomplish by the arrangement shown in Fig. 11, when considered in connection with Fig. 8. As illustrated in these figures, I provide an annular channel 87 on the outer surface of the fixed tubular structure 9 and in this channel work a series of rollers 88, each carried by an arm 89 pivoted at approximately 90° to the forward rotary tubular structure 10. A spring 92 is interposed between the end of the lever 89 and a lug 91 carried by the structure 10, while at the other side of the lever 89 an adjustable stop screw 93 is provided. From this it will be seen that the springs 92 serve to sustain the axial thrust of the forward rotor during normal operation. A somewhat similar arrangement as indicated at 94, 95 in Fig. 8 is employed to cushion and sustain the axial thrust of the rear rotor.

Figures 9, 10, 11:
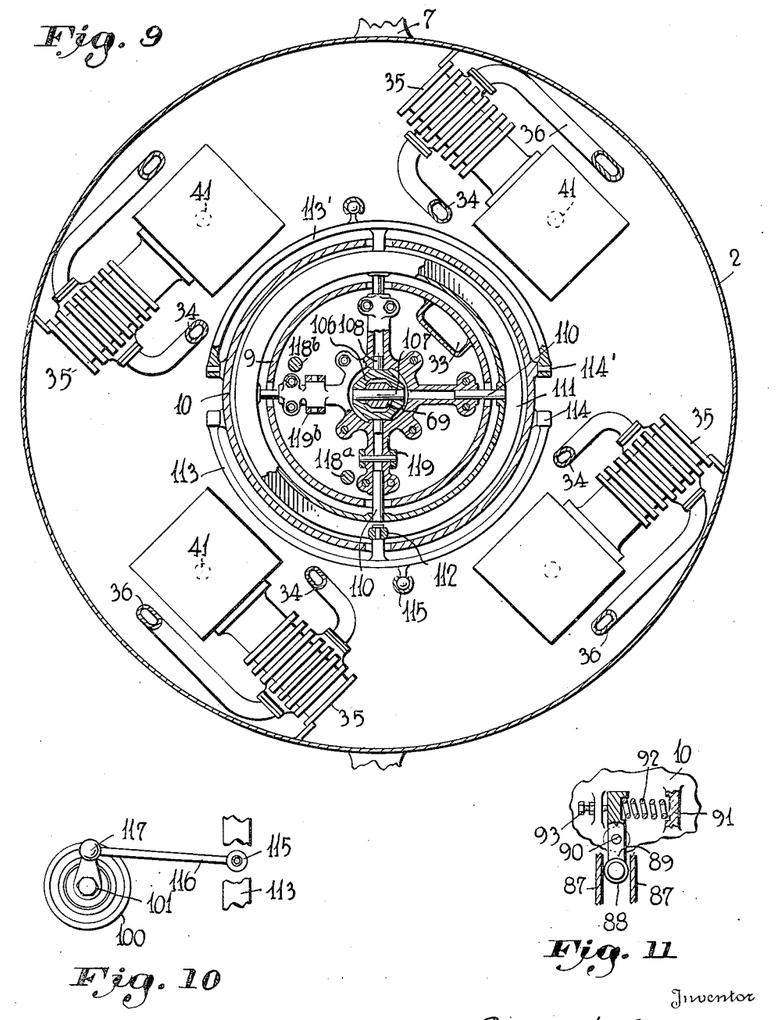
Fig. 9 is a transverse section substantially on the line 9—9 of Fig. 8, looking in the direction of the arrows.
Fig. 10 is a detailed view taken substantially on the line 10—10 of Fig. 8 looking in the direction of the arrows.
Fig. 11 is a fragmentary section substantially on the line 11—11 of Fig. 8, looking in the direction of the arrows.

When landing endwise, however, as above described, the axial thrust on these rotors may become very severe. In order, therefore, to sustain this excessive thrust at the moment of landing, and to relieve the rollers 88, such as shown in Fig. 11, from undue strain, I arrange buffer or braking surfaces between the rotary parts themselves and between these parts and the fixed structure. Thus, between the rotary tubular structure 10 and 49, 50, I provide annular buffer or braking surfaces 96, and between the rear rotary structure 49, 50 and the fixed element 85, I provide buffer or braking surfaces 97. Thus, the axial thrust on the rotors due to landing is transmitted through these buffer surfaces to the member 85 and thence to the fixed tubular structure 9 to which, in turn, the landing gear is connected.

Referring now to the mounting of the propeller blades, it will be seen by reference to Fig. 8 that I provide struts 98 and 98a connected to an annular member 99 by pivots 99a, and that inside of this annular member 99 is a second annular member 100 connected with the member 99 by pivots 100a at right angles to the pivots 99a, thus forming a universal joint.

Mounted for rotation inside of the member 100, by means of suitable anti-friction bearings is the shank 101 of the propeller blade. This extends out through the shell section 2 and is rigidly connected in any suitable way with the blade 7.

Similarly, for the rear rotor, I provide struts 102 and 102a pivotally connected to an annular member 103 in which is a second annular member 104 connected therewith to form a universal joint, and within the member 104 is rotatably mounted the shank 105 which is rigidly connected with the propeller blade 8.

As stated in the preamble, these propeller blades are of the variable pitch type, and I will now describe the means by which the pitch is varied and controlled. Reference has already been made to the control rod or shaft 69 which extends centrally through the tubular structure 9 and operates the change-speed gear already herein described. Rigidly secured to this shaft 69 near its center is a universal joint member 106 (see Fig. 9) connected by a pivot pin 107 to the shaft 69 and by pivot pins 108, at right angles thereto, to a casting 109 having two sets of radial arms or spokes disposed at right angles to each other, from the ends of which project pins 110 which extend through openings in the fixed tubular structure 9 and are rigidly attached to an annular channel 111, surrounding said tubular structure.

As a result of the above described construction, it will be seen that as the shaft 69 is reciprocated, the casting 109, and with it the annular channel 111, will be likewise reciprocated, and the channel will be moved successively into planes parallel with itself.

A pair of arcuate members 113 and 113' are pivoted at their ends at 114 and 114' (see Fig. 9) to the outside of the tubular structure 10, and rollers 112 mounted on arms projecting radially through slots in the tubular structure 10 and carried by the arcuate members 113 and 113' engage the annular channel 111.

Connected with each arcuate member 113 and 113' by means of a ball and socket joint 115 is a link 116 connected with a crank arm 117 carried by the inner end of the shank 101 of each of the propeller blades 7 (see Fig. 10).

A similar construction is provided for the rear propeller blades 8, namely, a casting 109a is secured by means of a universal joint to the rear end of the shaft 69 and this casting is connected to an annular channel 111a in which work roller 112a carried by arcuate members 113a connected by links 116a with crank arms carried by the shanks 105 of the propeller blades 8.

As a result of the construction above described, it will be seen that when the castings 109 and 109a and the annular channels 111 and 111a are moved back and forth, the crank arms 117 of the propeller shanks will be similarly operated, through the medium of the rollers 112 and 112a and links 116 and 116a, and the propeller blades 7 and 8 will be angularly adjusted about their axes. Thus, the pitch of both propeller blades may be varied as required by different conditions.

When it is desired to cause the aircraft to rise vertically from rest, it is necessary to operate the propellers at a higher speed than that required for horizontal flight, and it is also desirable to set the blades at a smaller pitch. Hence, it will be noted that I have provided a common control shaft 69 for simultaneously shifting the change-speed gear and for changing the pitch of the blades, so that this pitch is automatically set to that value which is most suitable for the particular speed selected. However, I may, if desired, provide independent controls for the change-speed gear and pitch-varying means.

It is also desirable to so construct the blades that they may yield slightly both in a fore and aft direction, and in the plane of rotation, as sudden changes in torque occur. This yielding movement takes place about the pivots 100a, and in order to resiliently cushion and stabilize such movement I preferably provide links 98b having resilient cushioning means 98c interposed therein and connected at one end by a universal joint with the annular member 100 and at the other end to a relatively fixed support. It will be understood that two such links are provided, connected with the member 100 at points substantially 90° apart, only one link, however, being shown in the drawings.

In order to guide and stabilize the aircraft, especially when rising or descending, it is desirable to be able to steer or balance it by varying the pitch of the blades unsymmetrically, that is to say, by making the pitch steeper at one side than at the other. I accomplish this by the control mechanism shown in detail in Figs. 8 and 9. Pivotally secured to one arm of the casting 109 as at 119 is one end of a link 118, the other end of which is pivotally connected to one arm of a bell crank 120 pivoted at 121 to a bracket 122 secured to the shaft 69.

A similar link 118a is connected at its rear end, as at 119a, to the casting 109a and at its forward end to one arm of a bell crank lever 120a, pivoted to the bracket 122.

Piston rods 123 connect the other ends of bell crank levers 120 and 120a to pistons 124 operating in the cylinders of an hydraulic actuator 125 pivoted at 126 to a bracket 127. The supply of motive fluid to and from the cylinders of this actuator is controlled by suitable valves (not shown).

By reference to Fig. 9, it will be understood that control links similar to 118 and 118a are also connected to another arm of the castings 109 and 109a, displaced 90° from the first mentioned arm. This second set of links is indicated at 118b and 119b. At their forward ends the links of this second set are connected to and operated by an hydraulic actuator similar to 125, but not shown in Fig. 8 of the drawings.

By virtue of the universal joints, connecting the castings 109 and 109a with the shaft 69, it will be seen that by properly controlling the hydraulic actuator 125, the annular channels 111 may be shifted into positions at an angle to their normal positions, that is to say, at an acute angle to the shaft 69, instead of at a right angle thereto. And by virtue of the fact that two sets of links 118 and 118a, disposed 90° apart as shown in Fig. 9, are employed, it is possible, by properly manipulating the controls to tilt the annular channels 111 and 111ᵃ into any desired angle either vertically or horizontally, or both. Thus, as the rollers 112 and 112ᵃ travel around the annular channels, the corresponding propeller blades will be shifted angularly during each revolution of the propellers, the pitch being steeper during one part of such revolution than during the other part. Hence it is possible to exert a greater thrust at one side of the aircraft than at the other, and thus steer or balance it as required. This is particularly desirable in connection with the type of aircraft illustrated in the figures so far described, since, as it will be noted, this type of aircraft is not provided with any rudder or tail surface for steering purposes, other than on the forward fins.

The control shaft 69 may also be conveniently operated by an hydraulic actuator and to this end the forward end of the shaft is connected by a link 128 to one end of a bell crank lever 129 pivoted at 130 to a fixed support, the other end of which is connected by a rod 131 to a piston 132 operating in a cylinder 133 pivotally mounted as at 134 to a fixed bracket 135.

An important feature of my improved aircraft as above described is the ability to stabilize the craft in both vertical and horizontal flight by changing the pitch of the rotor blades as the craft changes from one position to the other.

Stability during vertical endwise flight requires that the aerodynamic forces due to the relative horizontal motion of the aircraft and surrounding air act on the craft in such a way as to produce a stabilizing couple.

Referring to Fig. 18, I have shown my improved aircraft as it appears when traveling vertically endwise, and in this figure I have indicated the center of gravity of the craft at the point $x$. If, due to sudden air currents or the like, the craft becomes slightly displaced from vertical position, as indicated by the angle $aob$ in Fig. 20, then the lifting force which carries the weight of the craft is indicated by the line $oa$ and there results a horizontal component $oc$ tending to move the craft sidewise or horizontally. If the horizontal component of the aerodynamic forces which act upon the craft as a result of this horizontal motion are applied at a point such as $y$, as indicated by the arrow $z$, which point may be defined as the aerodynamic center, and this center is, as indicated in Fig. 18, located above or forward of the center of gravity, there will be produced a stabilizing couple tending to restore the craft to its vertical position.

If the rotors are well to the rear, or if the nose of the craft is very long, the aerodynamic center would probably be above the center of gravity, as indicated in Fig. 18, without any stabilizing surfaces, but in most cases it is preferable, as shown in the drawings, to provide stabilizing fins 13 and 14 at the nose of the craft, in order to assure that the aerodynamic center will be above the center of gravity. Moreover, it is desirable to make the fins 14 somewhat larger than the fins 13 in order to counteract the effect of the wings 12, even though these wings be relatively small.

It will be noted that the projected side area of the rotor blades, as seen in Fig. 18, is relatively small because of the low blade pitch during vertical flight. The blades, therefore, under these conditions are relatively ineffective as fin surfaces.

In order to assure stability during horizontal flight, it is desirable that the aerodynamic center be behind or aft of the center of gravity. Fig. 19 shows the craft in side elevation during horizontal flight and it will be seen that the rotor blades 7 and 8 are adjusted to relatively steep pitch, as already described. Under these conditions the projected side area of the rotor blades is relatively large and hence these blades constitute very effective fin surfaces against which the surrounding air may act. Since the centroid of the combined blade area is well behind the center of gravity, this increase in the projected side area of the blades resulting from their increased pitch for horizontal flight will tend to cause the aerodynamic center to shift rearwardly to a position aft of the center of gravity, as shown at $x$ in Fig. 19. It will, therefore, be seen that, when the relative areas of the fins, wings and blades are properly proportioned, it is possible to utilize the change in rotor blade pitch as between vertical and horizontal flight to shift the position of the aerodynamic center relative to the center of gravity and thus produce the desired stability under both conditions.

The principle may be made clearer by the following additional explanation. As above pointed out, the fins 14 preferably have a somewhat larger area to counteract the wings 12, so far as their effect on the location of the aerodynamic center of the aircraft is concerned. Accordingly, the position of the aerodynamic center is then determined largely by the combined action of the net effective fin area and the surfaces of the propeller blades. The net effective fin area, in this case, is defined as the area of the fins 13 and 14, together with the effective fin area of the fuselage, after deducting the extra area added to fins 14 to counteract the wings 12. The effect of the surfaces of the propeller blades in determining the position of the aerodynamic center may be considered to be substantially proportional to the projected side area of the propeller blades, and therefore increases with the pitch of said blades. In other words, the result of increased projected side area of the blades is to cause the aerodynamic center to move toward the blades. Accordingly, if the propeller blades are so mounted that the centroid of their combined projected side area is aft of the center of gravity, the effect of increasing the pitch of the blades, as is required in changing from vertical to horizontal flight, will be to move the aerodynamic center rearward. Inasmuch as the blades are of relatively large area and diameter this shifting of the aerodynamic center will be so great as to cause it to change its position relative to the center of gravity. It follows, therefore, that, as above stated, the aerodynamic center is located above the center of gravity of the aircraft, when in vertical flight, which location is favorable to stability in vertical flight, and due to the increase in propeller blade pitch, necessary in changing to horizontal flight, is moved to a location rearward of the center of gravity when in horizontal flight, which location is essential to stability under such conditions.

Figures 12, 13, 14, 15, 16:
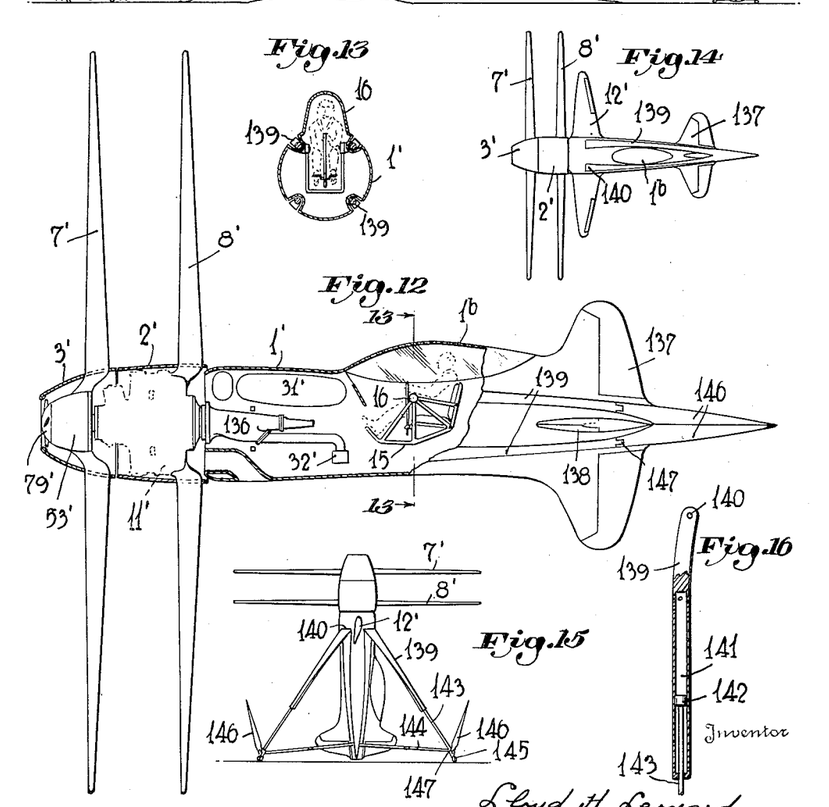
Fig. 12 is a side elevation somewhat similar to Fig. 2 but showing a modified construction of aircraft.
Fig. 13 is a transverse section substantially on the line 13—13 of Fig. 12, looking in the direction of the arrows.
Fig. 14 is a plan view on a reduced scale showing the aircraft illustrated in Fig. 12.
Fig. 15 is a view on a reduced scale showing the aircraft illustrated in Figs. 12 and 14 with the landing gear expanded as it appears when supporting the aircraft on the ground.
Fig. 16 is an enlarged detailed view of a portion of the landing gear shown in Fig. 15, parts being in section and parts broken away.

While I have so far shown and described an aircraft in which the propeller means are located amidships at the rear of the passenger compartment, I also contemplate a construction in which the propeller means are located at the nose or forward end of the craft. Such an arrangement is illustrated in Figs. 12, 14 and 15. Referring to these figures, the fuselage comprises a fixed section 1' containing a passenger compartment in which the pivotally mounted seat 15 is located and provided with a transparent roof 1ᵇ. Two rotary sections 2' and 3' are provided at the front of the fuselage, the forward section 3' carrying the propeller blades 7' and the rear section 2' carrying the propeller blades 8'.

An engine of any suitable type is indicated at 11', the frame of this engine being secured to and rotating with the section 2', and rear blades 8'. A special engine mount 136 is provided to permit this rotation. The fuel tank and carbureter are conventionally illustrated at 31' and 32', respectively. No attempt is made in this small scale drawing to show any control means but any suitable controls may be employed. The shaft of the engine extends forwardly into a gear box or transmission housing 53', in which housing I contemplate enclosing change-speed gearing of any suitable type. By shifting this gearing as desired, the speed of both propellers may be changed to meet different conditions as explained in connection with Figs. 1 to 9. A fan 79' may be placed at the forward end of the gear box and in an opening in the rotary section 3', if desired, to induce a greater flow of cooling air through the rotary sections and over the engine frame.

Unlike the modification shown in the preceding figures, I provide in the construction shown in Figs. 12 to 15, the usual vertical and horizontal rudders 137 and 138, located in the tail of the fuselage.

In these figures I have illustrated a type of landing gear different from that shown in the preceding figures. This gear comprises a plurality of leg members 139 extending longitudinally of the fuselage and pivoted thereto at their forward ends as at 140. Each leg member is made up of a pair of telescopic sections as shown in Fig. 16, the upper section containing a cylinder 141 in which a piston 142 carried by a piston rod 143 is mounted to slide. The purpose of this piston and cylinder arrangement is, of course, to provide a cushion to absorb the shock of landing when the legs engage the ground. The lower ends of the rods 143 are provided with ground engaging rollers 145 and are connected with the tail of the fuselage by jointed brace rods 144. Suitable control gear (not shown) for moving these leg members into and out of operative position is provided.

It will be understood that these leg members, during flight, are housed snugly in recesses in the fuselage and conform with the streamlined shape thereof, as shown in Fig. 13, so as to offer practically no air resistance. In order to still further carry out the streamlined form, tapered segments 146 are pivotally secured as at 147 to the free ends of the legs, and when in flight, these segments fit together to form a pointed tail as shown in Figs. 12 and 14. When the legs are expanded so as to bring the landing gear into operative position to support the craft, means are provided for turning back the segments 146 into the position shown in Fig. 15 where they are out of the way. As in the preceding figures, it will be noted that the legs when expanded form a broad base on which the craft is supported in an upright position as shown in Fig. 15.

Figure 17:
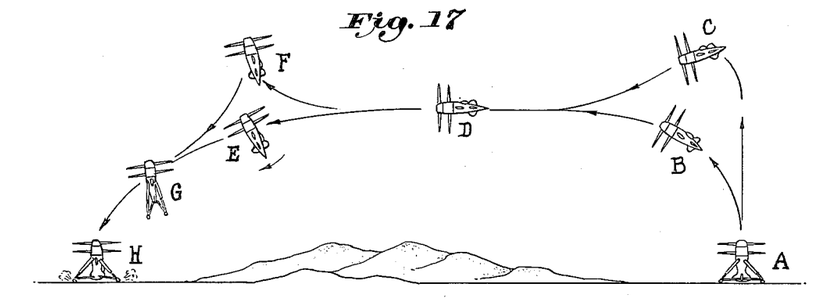
Fig. 17 is a diagrammatic view illustrating the method of flight of my improved aircraft.

In Fig. 17, I have endeavored to illustrate the method of flight of aircraft such as herein described. Although in this figure, the modified form of aircraft shown in Figs. 12 to 15 is illustrated by way of example, it will, of course, be understood that the form of aircraft shown in Figs. 1 to 9 operates in substantially the same manner, except for the specific difference in the landing gear.

In either case, the aircraft is supported on the ground by means of the landing gear in an upright position as shown at A, at the right of Fig. 17. After the propellers have been brought to the proper speed, the machine rises vertically, and as it rises, the landing gear is shifted to the collapsed or flying position. After rising to the desired height, the pilot, either by controlling the pitch of the propellers or by means of a rudder or both, brings the craft into a more or less horizontal position for normal flight. This may be done either by gradually levelling off as shown at B or by rising to a higher level than desired as indicated at C and then dropping to some extent along the lines indicated by the arrow. Normal flight is indicated at D.

When it is desired to land, the pilot may either, by manipulating the controls, allow the craft to drift into substantially vertical position as shown at E, or he may point the nose upward as shown at F, and then descend. In either case, the descent is effected endwise, and tail first. When approaching the ground, with a manually controlled landing gear such as shown in Figs. 12 to 15, the pilot begins to expand the leg members into operative position as illustrated at G, and before reaching the ground his landing gear is fully expanded so that the craft finally lands in the manner illustrated at H. One of the outstanding advantages of this method is, as will be readily appreciated, the fact that no long smooth runway is required either for taking off or landing, and it is thus possible to operate in rough terrain without any special landing facilities.

While it is contemplated that, under normal conditions, a landing will be made under power, that is to say, with the propellers being driven, in which case, by regulating the speed, the pilot may descend as slowly as desired, emergencies may arise in which it is necessary to land with the engine or engines "dead." In this case, the free-wheeling unit or one-way clutch employed between the propeller and engine as described in connection with Fig. 8 will permit the propellers to rotate freely, and to thus offer considerable resistance. The chief factor determining the size of the propellers in aircraft of this type is the necessity for providing a surface large enough to afford sufficient resistance to enable a safe landing to be made, even without power. Thus, the propellers will usually be abnormally large as compared with propellers commonly used on craft of the airplane type.

In such craft of the usual type, where the plane has to take off and land in a horizontal position, the size of the propellers is limited by the question of ground clearance. In craft of the present type, however, there is no such limitation, since as clearly appears from Figs. 15 and 17, the craft is supported upon the ground in upright position with the propeller blades extending in a substantially horizontal position at a point well above the ground. Therefore, they may be made as large as desired without any danger of contacting the ground.

From the foregoing description, it will be noted that my improved aircraft operates as a helicopter only when taking off or descending. Moreover, it differs fundamentally in principle from the "auto-gyro" in that the rotor blades operate in a plane transverse to the axis of the fuselage and transverse to the line of flight. A characteristic feature of the present invention is the fact that the same propeller means is employed both for ascending and descending and for driving the craft during normal horizontal flight, and no auxiliary propelling means is required.

While I have shown and described my propeller means as comprising a pair of twin or tandem propellers revolving in opposite directions, so as to neutralize their torque, the invention, in its broader aspects, contemplates the possibility of using only a single propeller, provided such propeller can be driven by reaction jets or similar means which does not impose a torque on the fuselage.

What I claim is:

1. An aircraft capable of both vertical and horizontal flight comprising an elongated fuselage having a nose section and a tail section, a pilot compartment in said nose section, means rigidly uniting said sections, propeller means mounted concentric with the axis of the fuselage at a point between said sections, and supporting wings projecting laterally from the forward end of said tail section of said fuselage at a point immediately behind said propeller means.

2. An aircraft comprising an elongated streamlined fuselage having nose and tail sections spaced apart, a rigid central tubular structure uniting said sections, a rotary tubular propeller section located between said nose and tail sections and conforming therewith, and power means connected to drive said tubular rotary propeller section, said power means rotating bodily with said rotary propeller section and located in the annular space between the same and said tubular structure.

3. An aircraft comprising an elongated fuselage having a nose section including a pilot compartment and having rotary propeller means operating in a plane transverse to the axis of said fuselage at the rear of said pilot compartment and capable of causing said aircraft to rise vertically endwise and of propelling it in horizontal flight, and landing gear at the tail end of said fuselage, said landing gear comprising longitudinally extending laterally expansible members, and means operated by contact with the ground, when landing endwise, for automatically expanding said members to form a broad base for supporting said fuselage in upright position.

4. An aircraft capable of both vertical and horizontal flight, said aircraft comprising an elongated fuselage having variable pitch propeller means operating in a plane transverse to its axis and capable of causing it to rise vertically, endwise, and then travel horizontally, and means for varying the pitch of the blades of said propeller means, said propeller means being so positioned with respect to the center of gravity that the aerodynamic center of the craft during vertical flight, with the propeller means in low pitch, is above or longitudinally forward of the center of gravity, and, during horizontal flight, with the propeller means in high pitch, is behind the center of gravity.

5. An aircraft capable of both vertical and horizontal flight, comprising an elongated fuselage having airfoil surfaces and variable pitch propeller means operating in a plane transverse to its axis and capable of causing it to rise vertically, endwise, and then travel horizontally, the areas of the several surfaces being so proportioned, and the propeller means being so located with respect to the center of gravity, that when the blades of the propeller means are adjusted to low pitch for causing the craft to rise vertically, the aerodynamic center is above or longitudinally forward of the center of gravity, and when the blades are adjusted to steep pitch for horizontal flight, the aerodynamic center is behind the center of gravity.

6. An aircraft capable of both vertical and horizontal flight having a pair of tandem, variable pitch propellers, an engine having two parts relatively rotatable about a common axis, one of said parts being operatively connected with each propeller, shiftable change speed gearing between one of said propellers and the engine part with which it is connected, and control means for shifting said gearing and changing the pitch of both propellers, whereby said propellers may be adjusted to low pitch and driven at relatively high speed for vertical flight, and may be adjusted to high pitch and driven at lower speed for horizontal flight.

7. An aircraft capable of both vertical and horizontal flight having an elongated fuselage and a variable pitch propeller operating in a plane transverse to its axis and capable of causing it to rise vertically endwise, and then travel horizontally, an engine for driving the same, shiftable change speed gearing between said engine and propeller, and means for shifting said gearing and changing the pitch of said propeller, whereby said propeller may be adjusted to low pitch and driven at relatively high speed for vertical flight, and may be adjusted to high pitch and driven at lower speed for horizontal flight.

8. An aircraft capable of both vertical and horizontal flight and having an elongated fuselage and a variable pitch propeller operating in a plane transverse to its axis and capable of causing it to rise vertically endwise, and then travel horizontally, an engine for driving the same, shiftable change speed gearing between said engine and propeller, and means for shifting said gearing into high speed position and setting said propeller at low pitch, for vertical flight, and for shifting said gearing into low speed position and setting said propeller at higher pitch, for horizontal flight.

9. An aircraft capable of flying both vertically and horizontally and having an elongated fuselage and variable pitch propeller means operating in a plane transverse to its axis, power means for driving said propeller means to provide both lift in vertical flight and forward thrust in horizontal flight, and a change-speed connection between said power means and said variable pitch propeller means.

10. An aircraft capable of flying both vertically and horizontally and having variable pitch propeller means, power means for driving said propeller means to provide both lift in vertical flight and forward thrust in horizontal flight, the axis of rotation of said propeller means coinciding substantially with the line of flight, and a change-speed connection between said power means and said variable pitch propeller means.

11. An aircraft capable of both vertical and horizontal flight, said aircraft having an elongated fuselage, and propeller means rotatable about an axis substantially coinciding with the axis of said fuselage, said axis being substantially vertical during vertical flight and substantially horizontal during horizontal flight, said propeller means comprising outwardly extending variable pitch blades and being located in such a position along said fuselage that the centroid of the projected side area of said blades shall be aft of the center of gravity of said aircraft, when in the horizontal flight attitude.

12. An aircraft capable of both vertical and horizontal flight, said aircraft comprising an elongated fuselage and a pair of longitudinally spaced variable pitch propellers rotatable about an axis substantially coinciding with the axis of said fuselage and located at such a point in the length of said fuselage intermediate its ends that the centroid of the projected side area of the blades when set at steep pitch shall be aft of the center of gravity of the aircraft.

13. An aircraft capable of both vertical and horizontal flight and comprising an elongated fuselage having variable pitch propeller means operating in a plane transverse to its axis at a point adjacent the mid-portion of its length, the total area of the blades of said propeller means being relatively so great as compared with that of other sustaining surfaces, and said propeller means being so positioned with respect to the center of gravity that a change in pitch of said propeller blades from low to high, or from high to low, such as required in changing from vertical to horizontal flight, or vice versa, serves to shift the position of the aerodynamic center longitudinally from one side to the other of the center of gravity of the aircraft.

14. An aircraft comprising an elongated fuselage made up of a nose section having therein a passenger compartment, a tail section spaced from and rigidly connected with said nose section, a pair of tandem rotary propeller sections located between said nose and tail sections, each of said propeller sections having blades projecting outwardly therefrom, said propeller sections being so positioned relative to the center of gravity, and the blades of one propeller section being so spaced longitudinally along the fuselage axis from those of the other section that the centroid of their combined projected side areas is rearward of the center of gravity of the aircraft.

15. An aircraft having an elongated fuselage comprising a nose section containing a pilot compartment, a tail section spaced from said nose section and rigidly connected therewith, a rotary propeller section mounted at a point intermediate said nose and tail sections, to rotate about the axis of said fuselage, and power means supported by and contained within said rotary propeller section and connected to drive the same.

16. An aircraft having an elongated fuselage comprising a nose section comprising a pilot compartment, a tail section spaced from said nose section and rigidly connected therewith, retractable landing gear carried by said tail section and constructed to support the aircraft in a substantially vertical position on the ground, a rotary propeller section mounted at a point intermediate said nose and tail sections, and power means located rearwardly of said pilot compartment for driving said propeller section.

17. An aircraft comprising an elongated fuselage made up of a nose section constituting a passenger compartment, a tail section spaced from and rigidly connected with said nose section, a pair of tandem rotary propeller sections located between said nose and tail sections, and power means supported by and mounted within one rotary section and connected to drive said sections in opposite directions.

18. An aircraft capable of both vertical and horizontal flight, said craft comprising an elongated fuselage having wings projecting from the sides thereof, a pair of duplicate propellers operating in planes substantially transverse at all times to the line of flight, each propeller comprising a hub member and a plurality of blades projecting outwardly therefrom, and means for causing said propellers to provide either the lift required for vertical flight or the forward thrust for horizontal flight, as desired.

19. An aircraft capable of both vertical and horizontal flight, said craft comprising an elongated fuselage having wings projecting from the sides thereof, and a pair of duplicate propellers operating in planes substantially transverse at all times to the line of flight, each propeller comprising a hub member and a plurality of blades projecting outwardly therefrom, whereby axial flow of air through both propellers during both vertical and horizontal flight results.

20. A heavier than air craft having an elongated fuselage that is adapted to be sustained in flight with the axis thereof arranged vertically or substantially horizontally, a pair of oppositely rotatable power driven axially spaced propellers having their axes of rotation arranged substantially co-axial with said axis of the fuselage, each of said propellers comprising a plurality of blades, all of the blades of both said propellers being of substantially the same size and form and being variable in pitch, one of said propellers being mounted adjacent the front of said fuselage, adjustable tail means at the rear of said fuselage for directing the flight of the craft, and means for supporting the craft on the ground with the fuselage in upright position.

21. A heavier than air craft having an elongated fuselage that is adapted to be sustained in flight with the axis thereof arranged vertically or substantially horizontally, a pair of oppositely rotatable power driven propellers having their axes of rotation arranged substantially co-axial with said axis of the fuselage, each of said propellers comprising a plurality of blades, all of the blades of both said propellers being of substantially the same size and form and being variable in pitch, one of said propellers being mounted adjacent the front of said fuselage, and the other of said propellers being spaced rearwardly therefrom a substantial distance, said propellers and the load of the craft being disposed and arranged so that the center of gravity of said craft is located between said propellers, and adjustable means adjacent one end of said fuselage for controlling and directing the flight of the craft.

22. A heavier than air craft having an elongated fuselage that is adapted to be sustained in flight with the axis thereof arranged vertically or substantially horizontally, a pair of oppositely rotatable power driven propellers having their axes of rotation arranged substantially co-axial with said axis of the fuselage, each of said propellers comprising a plurality of blades, all of the blades of both said propellers being of substantially the same size and form and being variable in pitch, said propellers being adapted to be driven with the pitch thereof set so that the torque re-action of one of said propellers on the fuselage substantially balances the torque re-action of the other of said propellers on the fuselage, one of said propellers being mounted adjacent the front of said fuselage and the other of said propellers being spaced rearwardly therefrom a substantial distance, said propellers and the load of the craft being disposed and arranged so that the center of gravity of said craft is located between said propellers, and fin means adjacent one end of said fuselage for stabilizing and controlling the flight of the craft.

23. A heavier than air craft having an elongated fuselage that is adapted to be sustained in flight with the axis thereof arranged vertically or substantially horizontally, a pair of oppositely rotatable power driven propellers having their axes of rotation arranged substantially co-axial with said axis of the fuselage, each of said propellers comprising a plurality of blades, all of the blades of both said propellers being of substantially the same size and form and being variable in pitch, to produce a slow screw for vertical take-off and a fast screw for horizontal flight, one of said propellers being mounted adjacent the front of said fuselage and the other of said propellers being spaced rearwardly therefrom a substantial distance, said propellers and the load of the craft being disposed and arranged so that the center of gravity of said craft is located between said propellers, and fin means adjacent one end of said fuselage for stabilizing and controlling the flight of the craft.

24. A heavier than air craft having an elongated fuselage that is adapted to be sustained in flight with the axis thereof arranged vertically or substantially horizontally, a pair of oppositely rotatable power driven axially spaced bands having their axes of rotation arranged substantially co-axial with said axis of the fuselage, the outer periphery of said bands being substantially flush with said fuselage, one of said bands encircling said fuselage a substantial distance rearwardly of the front thereof, each of said bands providing a mounting for a propeller, each of said propellers comprising a plurality of blades, all of the blades of both said propellers being of substantially the same size and form and being variable in pitch, said propellers and the load of the craft being disposed and arranged so that the center of gravity of said craft is located between the planes of rotation of said propellers, and fin means adjacent one end of said fuselage for stabilizing and controlling the flight of the craft.

25. A heavier than air craft capable of both vertical and horizontal flight and having an elongated fuselage, a power driven propeller rotatable about an axis substantially co-inciding with the axis of said fuselage, said axis being substantially vertical during vertical flight and substantially horizontal during horizontal flight, landing gear at the tail of the fuselage and capable of supporting the fuselage in upright position on the ground, said propeller being mounted on said fuselage at a point adjacent said landing gear and rearward of the center of gravity of the craft, wing means projecting from said fuselage at a point forward of said propeller, and additional propeller means for counteracting the torque reaction of said propeller on the fuselage.

LLOYD H. LEONARD.